(12) United States Patent
Kobayashi et al.

(10) Patent No.: US 7,904,966 B2
(45) Date of Patent: Mar. 8, 2011

(54) SCANNING PROBE MICROSCOPE APPARATUS

(75) Inventors: Dai Kobayashi, Adachi-ku (JP); Shuhei Nishida, Kunitachi (JP); Hideki Kawakatsu, Setagaya-ku (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 204 days.

(21) Appl. No.: 12/375,683

(22) PCT Filed: Jul. 19, 2007

(86) PCT No.: PCT/JP2007/064237
§ 371 (c)(1),
(2), (4) Date: Jan. 30, 2009

(87) PCT Pub. No.: WO2008/015916
PCT Pub. Date: Feb. 7, 2008

(65) Prior Publication Data
US 2009/0261249 A1    Oct. 22, 2009

(30) Foreign Application Priority Data

Jul. 31, 2006    (JP) .................................. 2006-207297

(51) Int. Cl.
*G01Q 60/32* (2010.01)
(52) U.S. Cl. ........ 850/37; 850/1; 850/2; 850/5; 977/851; 977/863
(58) Field of Classification Search .................. 250/306, 250/307, 309, 310, 311; 73/104, 105; 850/1, 850/2, 3, 4, 5, 6, 7, 37; 977/902, 947, 949, 977/950, 954, 851, 863
See application file for complete search history.

(56) References Cited

U.S. PATENT DOCUMENTS

| 5,507,179 | A | * | 4/1996 | Gamble et al. | .................. 73/105 |
| 5,631,410 | A | | 5/1997 | Kitamura | |
| 5,966,053 | A | * | 10/1999 | Durig et al. | .............. 331/116 M |
| 2005/0120781 | A1 | * | 6/2005 | Kitamura | ........................ 73/105 |

FOREIGN PATENT DOCUMENTS

| JP | 8 166396 | 6/1996 |
| JP | 2003 194699 | 7/2003 |

* cited by examiner

*Primary Examiner* — Jack I Berman
*Assistant Examiner* — Nicole Ippolito Rausch
(74) *Attorney, Agent, or Firm* — Oblon, Spivak, McClelland, Maier & Neustadt, L.L.P.

(57) ABSTRACT

There is provided a scanning probe microscope apparatus which has a high sensitivity for the interaction between the cantilever and the sample and comprises a cantilever that can oscillate stably in dynamic mode even when a mechanical Q value is low.

A driving signal having a frequency close to the resonant frequency of the cantilever (4) is supplied from the signal generator (9) to the oscillation exciting means (10) to separately (forcibly) oscillate the cantilever (4). And the frequency of the driving signal or the resonant frequency of the cantilever is controlled (by adjusting the distance between the cantilever (4) and the sample (1)), such that the phase difference between the oscillation of the cantilever (4) detected by the oscillation detecting means (5) and the driving signal becomes zero, i.e. the frequency of the driving signal and the resonant frequency of the cantilever (4) match.

6 Claims, 7 Drawing Sheets

SCANNING PROBE MICROSCOPE APPARATUS

TECHNICAL FIELD

The present invention relates to a scanning probe microscope apparatus.

BACKGROUND ART

One of the imaging modes of an atomic force microscope, which is a kind of scanning probe microscopes, is FM (Frequency Modulation) mode. In FM mode, a cantilever of the atomic force microscope apparatus is self-oscillated, and the interaction force between the cantilever and a sample is detected from the changes in the oscillation frequency. Then, the interaction force is imaged, or the surface shape of the sample is imaged by adjusting the distance between the cantilever and the sample such that the interaction force is kept constant.

Figures 1A, 1B:
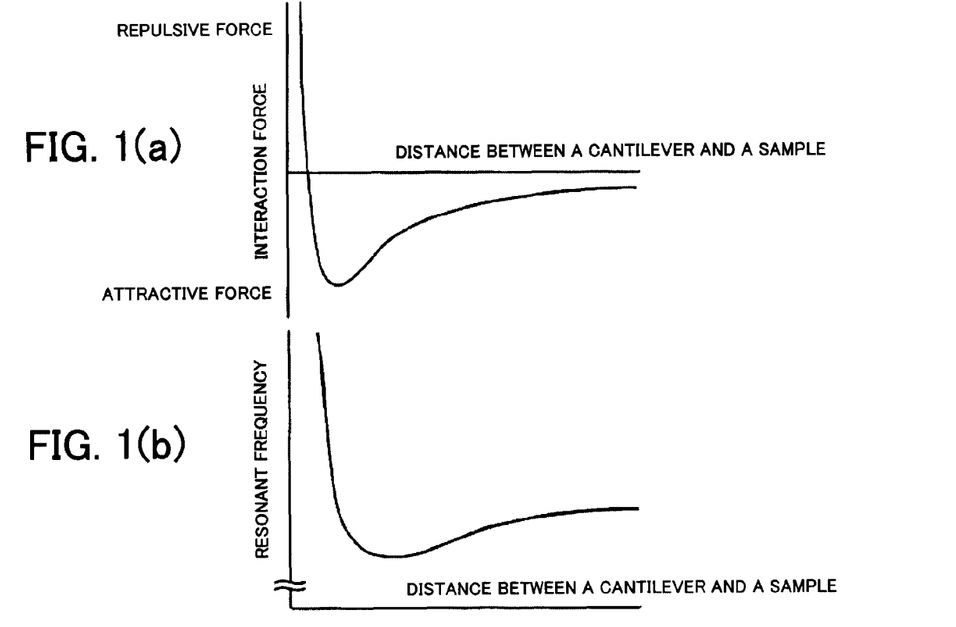

FIG. 1(a) and FIG. 1(b) are graphs showing characteristics of a conventional scanning probe microscope.

FIG. 1(a) is a graph showing an example of a relationship between the interaction force and the distance between the cantilever and the sample. The cantilever has a particular mechanical resonant frequency which is determined by its own spring constant and a mass. When an external force as shown in FIG. 1(a) which varies with the distance between the cantilever and the sample is applied, an apparent spring constant is changed and therefore the resonant frequency is changed. FIG. 1(b) is a graph showing an example of a relationship between the resonant frequency and the distance between the cantilever and the sample.

Figure 2:
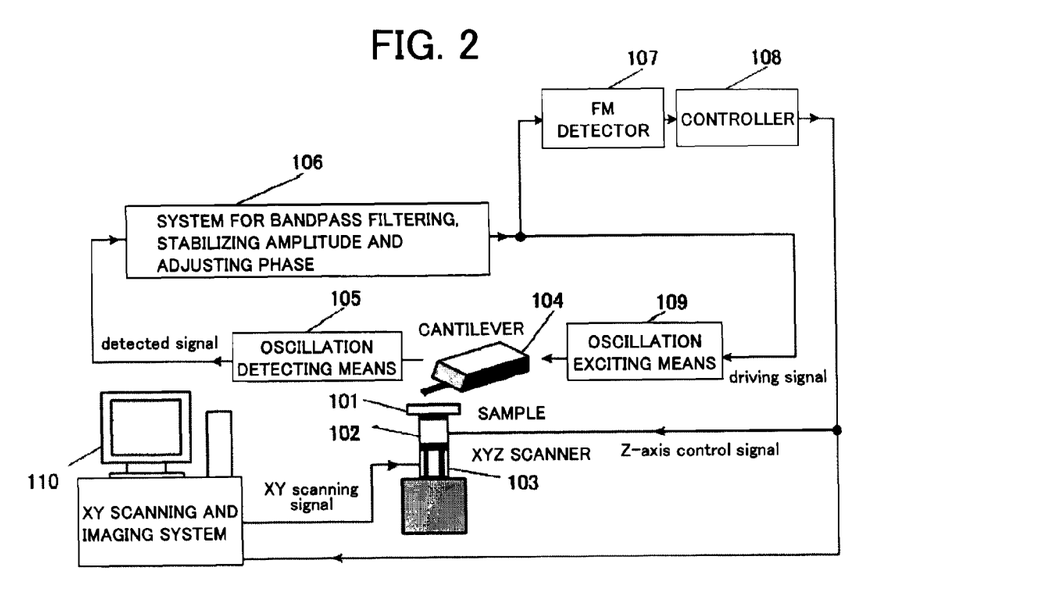
FIG. 2 is a block diagram showing an example of a control system of a conventional FM mode atomic force microscope.

FIG. 2 shows an example of a control system of a conventional FM mode atomic force microscope.

FIG. 2 shows a sample 101, a sample stage 102, an XYZ scanner 103, a cantilever 104 that measures characteristics of the sample 101, an oscillation detecting means 105 for detecting an oscillation of the cantilever 104, a detected signal waveform processing system 106 that receives a detected signal from the oscillation detecting means 105 to bandpass filter, stabilize amplitude and adjust phase, an FM detector 107 that is connected to the detected signal waveform processing system 106, a controller 108 that is connected to the FM detector 107, an oscillation exciting means 109 that is connected to the detected signal waveform processing system 106, an XY scanning and imaging system 110. The sample 101 can be scanned in the XYZ directions by using a Z-axis control signal from the controller 108 and an XY scanning signal from the XY scanning and imaging system 110.

In other words, a detected signal of an oscillation of the cantilever 104 is amplified, stabilized in amplitude, and phase-adjusted if necessary by the detected signal waveform processing system 106. Then the signal is fed back to the oscillation exciting means 109, and the cantilever 104 is self-oscillated at the resonant frequency. The resonant frequency of the cantilever 104 and therefore the interaction force between the cantilever 104 and the sample 101 can be obtained by detecting the frequency of the self-excited oscillation by the FM detector 107.

An interaction force image can be obtained by XY scanning the sample 101 according to an XY scanning signal from the XY scanning and imaging system 110 while detecting the interaction force as described above, and imaging the interaction force at each XY coordinate point. Furthermore, an image of the surface shape of the sample 101 can also be obtained by XY scanning the sample 101 while controlling the distance between the cantilever 104 and the sample 101, which is the position of the Z-axis, according to the Z-axis control signal from the controller 108 such that the interaction force is kept constant.

The feedback loop (self-excitation loop) which generates a self-excited oscillation may include frequency conversion process. This system is called a super heterodyne system. The super heterodyne system can be combined with a PLL to stabilize the oscillation.

Phase feedback system used in sample imaging apparatus is described in Applied Surface Science 157 (2000), pp. 332-336. The phase feedback system will be hereinafter described in detail.

Oscillation of a cantilever is described in WO 02/103328.

A probe and probe microscope apparatus are described in WO 2005/015570.

DISCLOSURE OF THE INVENTION

A cantilever has a plurality of oscillation modes. And other mechanism than a cantilever may have their own resonant frequency, or a cantilever may have a parasitic resonant frequency due to reflection of sound waves at water surface when disposed in water. Therefore, in order to generate a self-excited oscillation of a cantilever in the desired mode, it is necessary to reduce loop gain in other modes than the desired mode by including a bandpass filter in the self-excitation loop. When resonant frequencies of neighboring modes are close to each other, the passband of the bandpass filter must be narrow.

When a cantilever is disposed such as in the air or water, the Q value thereof as a mechanical oscillator is reduced. Accordingly, the S/N ratio of the detected signal is lowered and the frequency and amplitude of the self-excited oscillation become unstable. Since the bandpass filter also removes noises included in the detected signal, a stable self-excited oscillation can be obtained even when the Q value is low by narrowing the passband of the bandpass filter However, when a bandpass filter with a narrow passband is used, an oscillation frequency is determined by the center frequency of the bandpass filter. Therefore, the original purpose, which is to detect the resonant frequency of the cantilever, cannot be fulfilled.

The oscillation can be stabilized by combining super heterodyne system with a PLL. However, this method is expensive because the device becomes complex. In addition, it is difficult for a user to understand the principle of the operation.

Figure 3:
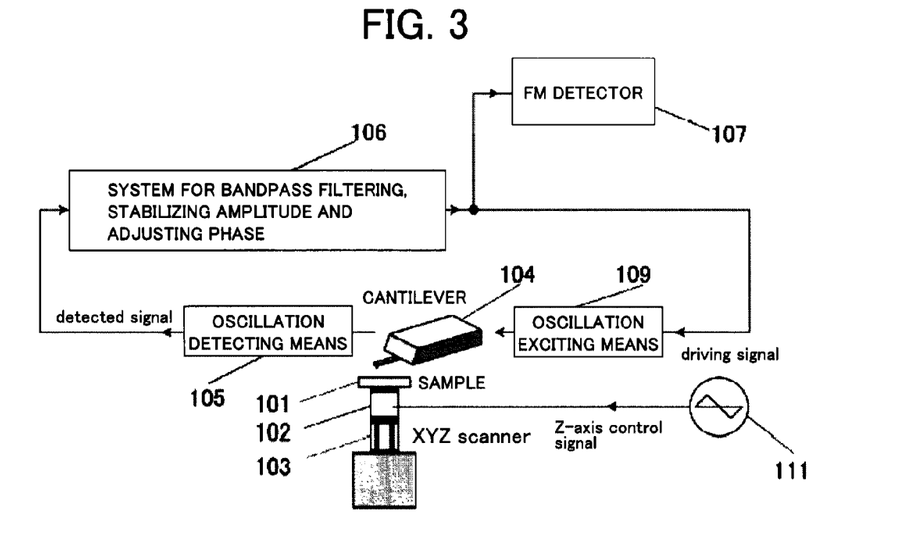
FIG. 3 is a block diagram showing a conventional system to measure a relationship between a resonant frequency and a distance between a cantilever and a sample.

FIG. 3 is a block diagram showing a conventional system to measure a relationship between a resonant frequency and a distance between a cantilever and a sample.

According to the conventional technology, the relationship between the resonant frequency and the distance between the cantilever and the sample (such as a plot shown in FIG. 1 (b)) is obtained by the steps of stopping XY scanning, forcibly inputting a triangle wave from a triangular wave generator 111 into the Z-axis, and detecting and plotting changes in a self-excited oscillation frequency by an FM detector 107 as shown in FIG. 3.

In this method, however, the distance between the cantilever and the sample is an input signal and the resonant frequency is an output signal. Therefore, measurement accuracy is low in the case where the resonant frequency changes steeply for small changes in the distance between the cantilever and the sample as shown in FIG. 1(b) on the left side of the minimum point of the curve. In addition, measurement time should be short for a drift in the Z-axis to be negligible, since the Z-axis is in open loop control system.

In view of the above problems, it is an object of the present invention to provide a scanning probe microscope apparatus which has a high sensitivity for the interaction between the cantilever and the sample and comprises a cantilever that can oscillate stably in dynamic mode even when a mechanical Q value is low.

To achieve the above object, the present invention provides:

[1] A scanning probe microscope apparatus for imaging a sample using an interaction between the sample and a mechanical oscillator, the scanning probe microscope apparatus comprising: a first controller; an XYZ scanner for the sample and an XY scanning and imaging system, each being connected to the first controller; a signal generator; an oscillation exciting means connected to the signal generator; a mechanical oscillator forcibly oscillated by an output signal from the oscillation exciting means; an oscillation detecting means for detecting an oscillation of the mechanical oscillator; a phase difference detecting means connected to the oscillation detecting means; and a second controller for receiving a phase difference signal from the phase difference detecting means and transmitting a frequency control signal to the first controller and the signal generator; wherein the signal generator is configured to generate a driving signal with a frequency close to the resonant frequency of the mechanical oscillator and to transmit the driving signal to the oscillation exciting means to oscillate the mechanical oscillator forcibly, and phase difference detected by the phase difference detecting means is kept constant.

[2] The scanning probe microscope apparatus according to [1], wherein the mechanical oscillator is a cantilever.

[3] The scanning probe microscope apparatus according to [1], further comprising: first connecting means for receiving the phase difference signal from the phase difference detecting means; second connecting means for receiving the frequency control signal from the second controller; first switching means for switching between the first connecting means and the second connecting means; and second switching means for switching the frequency control signal from the second controller on and off; wherein the first controller is connected to the output side of the first switching means, and the signal generator is connected to the output side of the second switching means.

[4] The scanning probe microscope apparatus according to [1], further comprising: a device for mixing the phase difference signal and the frequency control signal at an arbitrary ratio and transmitting the mixed signal to the first controller; and a device for adjusting the frequency control signal to an arbitrary intensity and transmitting the adjusted signal to the signal generator.

[5] The scanning probe microscope apparatus according to any one of [1] to [4], wherein a resonant frequency of the mechanical oscillator is measured and an interaction force between the sample and the mechanical oscillator is imaged based on the resonant frequency.

[6] The scanning probe microscope apparatus according to any one of [1] to [4], wherein a resonant frequency of the mechanical oscillator is measured and a surface shape of the sample is imaged based on the resonant frequency.

[7] The scanning probe microscope apparatus according to any one of [1] to [4], wherein a resonant frequency of the mechanical oscillator is measured and a relationship between the resonant frequency and a distance between the mechanical oscillator and the sample is obtained based on the resonant frequency.

BRIEF DESCRIPTION OF THE DRAWINGS

FIG. 1 (a) is a graph showing a relationship between an interaction force and a distance between a cantilever and a sample in a conventional scanning probe microscope.

FIG. 1(b) is a graph showing a relationship between a resonant frequency and a distance between a cantilever and a sample in a conventional scanning probe microscope.

BEST MODE FOR CARRYING OUT THE INVENTION

A scanning probe microscope apparatus of the present invention comprises a first controller, an XYZ scanner for a sample and an XY scanning and imaging system, both of which are connected to the first controller, a signal generator, an oscillation exciting means that is connected to the signal generator, a mechanical oscillator that is oscillated forcibly by an output signal from the oscillation exciting means, an oscillation detecting means that detects an oscillation of the mechanical oscillator, a phase difference detecting means that is connected to the oscillation detecting means, and a second controller that receives a phase difference signal from the phase difference detecting means and transmits a frequency control signal to the first controller and the signal generator, wherein the signal generator is configured to generate a driving signal with a frequency close to the resonant frequency of the mechanical oscillator and to transmit the driving signal to the oscillation exciting means to forcibly oscillate the mechanical oscillator, phase difference detected by the phase difference detecting means is kept constant, thereby imaging a sample.

Embodiments

Hereinafter, embodiments of the present invention will be described in detail.

Figure 4:
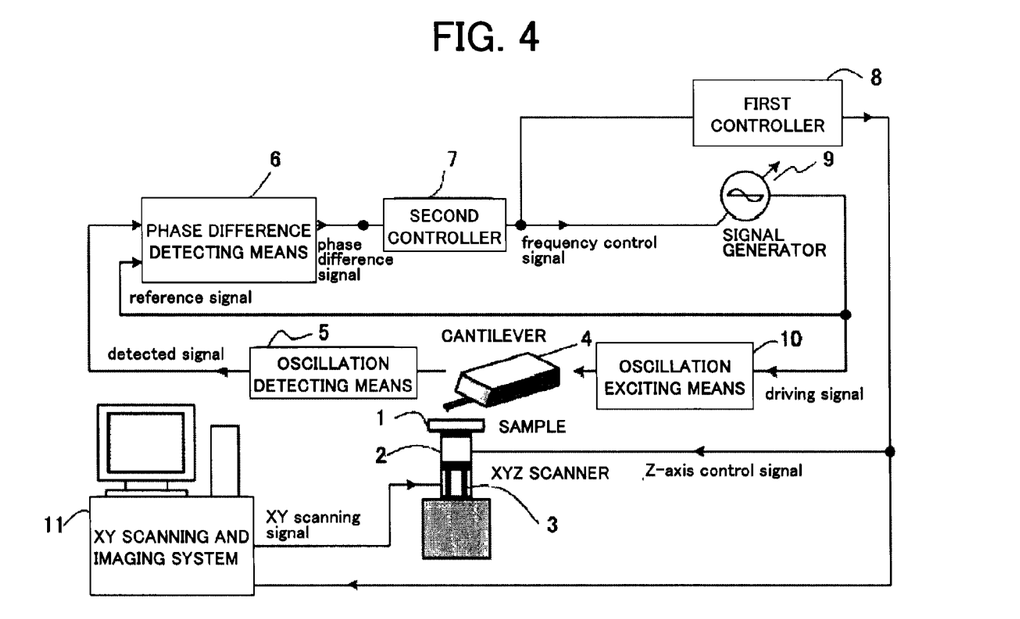
FIG. 4 is a block diagram showing the system configuration (frequency-tracking separately excited system) of a scanning probe microscope apparatus in accordance with a first embodiment of the present invention.

FIG. 4 is a block diagram showing the system configuration (frequency-tracking separately excited system) of a scanning probe microscope apparatus in accordance with a first embodiment of the present invention.

FIG. 4 shows a sample 1, a sample stage 2, an XYZ scanner 3, a cantilever 4 for imaging the sample 1, an oscillation detecting means 5 that detects an oscillation of the cantilever 4, a phase difference detecting means 6 that receives a detected signal from the oscillation detecting means 5, a second controller 7 that receives a phase difference signal from the phase difference detecting means 6, a first controller 8 that is connected to the second controller 7, a signal generator 9 that receives a frequency control signal from the second controller 7, an oscillation exciting means 10 that receives a driving signal from the signal generator 9, an XY scanning and imaging system 11 that is connected to the first controller 8. A Z-axis control signal from the first controller 8 is transmitted to the XYZ scanner 3. The driving signal from the signal generator 9 oscillates the cantilever 4 via the oscillation exciting means 10. The driving signal from the signal generator 9 is also transmitted to the phase difference detecting means 6 as a reference signal.

In this system, the frequency of the signal generator 9 is changed such that the phase difference detected by the phase difference detecting means 6 becomes zero, and the frequency of the driving signal is controlled automatically so as to match the resonant frequency of the cantilever 4. A magnitude of the frequency control signal is equal to the amount of correction necessary to make the frequency of the signal generator 9 match the resonant frequency of the cantilever 4. In other words, a magnitude of the frequency control signal indicates the resonant frequency of the cantilever 4 (with a constant offset value).

Therefore, resonant frequency image, in other words an interaction force image, is obtained by plotting a magnitude of the frequency control signal at each point in the XY coordinates. In addition, a surface shape image of the sample 1 is obtained by controlling the distance between the cantilever 4 and the sample 1, which is the position of the Z-axis, such that the frequency control signal is always zero, and by plotting the position of the Z-axis at each point in the XY coordinates.

In short, a driving signal with a frequency close to the resonant frequency of the cantilever 4 is supplied from the signal generator 9 to the oscillation exciting means 10 to separately (forcibly) oscillate the cantilever 4. And the frequency of the driving signal or the resonant frequency of the cantilever is controlled (by adjusting the distance between the cantilever 4 and the sample 1), such that the phase difference between the oscillation of the cantilever 4 detected by the oscillation detecting means 5 and the driving signal becomes zero, i.e. the frequency of the driving signal and the resonant frequency of the cantilever 4 match.

Next, phase feedback system will be described as a reference example of the present invention.

Figure 5:
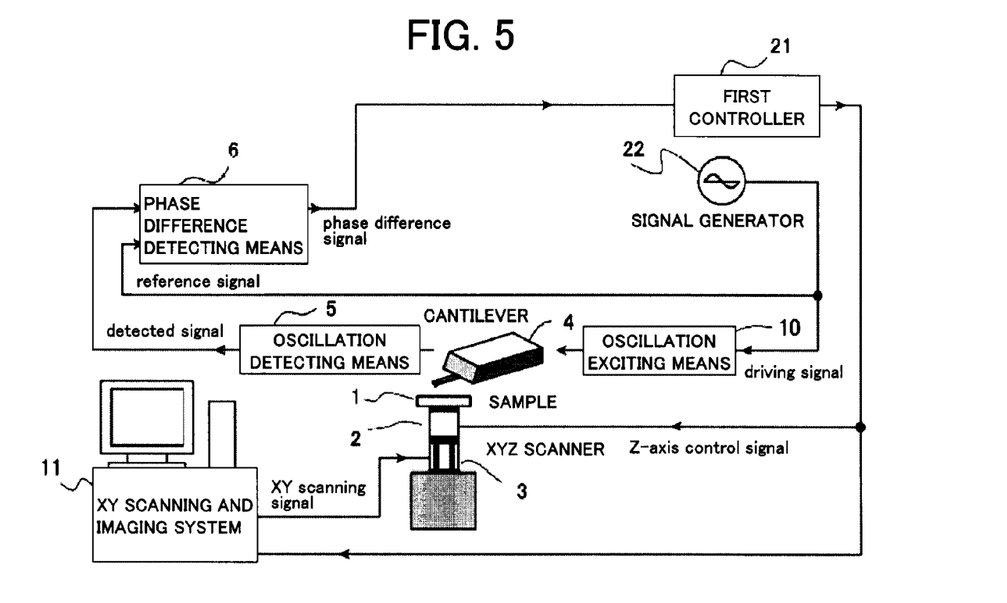
FIG. 5 is a block diagram showing the system configuration (phase feedback system) of a scanning probe microscope apparatus in accordance with a reference example of the present invention.

FIG. 5 is a block diagram showing the system configuration (phase feedback system) of a scanning probe microscope apparatus in accordance with a reference example of the present invention.

FIG. 5 shows a block diagram with the second controller 7 removed from that of shown in FIG. 4. This system monitors only the phase difference signal. In other words, only a phase difference signal is transmitted to a first controller 21, a frequency control signal is not transmitted to a signal generator 22, and the signal generator 22 generates a signal independently.

In this system, the distance between the cantilever 4 and the sample 1, which is the position of the Z-axis, is controlled such that the phase difference detected by the phase difference detecting means 6 becomes zero. This means that the interaction force is controlled to be constant. A surface shape image of the sample 1 is obtained by plotting the position of the Z-axis at each point in the XY coordinates.

When the response of the Z-axis control is slow, the correction cannot keep up with variation in the interaction force due to XY scan, i.e. variation in the phase difference signal. Therefore, information of the interaction force remains in the phase difference signal, and an interaction force image is obtained by plotting the phase difference signal at each point in the XY coordinates.

A block diagram of one of the control systems of tapping mode AFM is almost same as that of shown in FIG. 5. In tapping mode, however, the interaction force is not detected from the resonant frequency of the cantilever and the amplitude of the oscillation of the cantilever is significantly larger, thus they are different.

Measurement of a $\Delta f$ versus Z curve by using phase feedback system will be described next.

Although phase feedback system described above is intended to obtain some images, Z-axis control in phase feedback system can also be used to measure variation in the resonant frequency with respect to the distance between the cantilever and the sample, which is $\Delta f$ versus Z curve, i.e. such as a plot shown in FIG. 1 (b), while stopping XY scanning.

In phase feedback system, a cantilever is always oscillated forcibly at a frequency of a frequency generator, and a distance between a cantilever and a sample is adjusted for the resonant frequency of the cantilever to match the frequency of the frequency generator.

Therefore, a profile of the resonant frequency versus the distance between the cantilever and the sample can be obtained by plotting the Z-axis control signal while changing the frequency of the signal generator.

In addition, an input is the resonant frequency and an output is the distance between the cantilever and the sample in this system. Therefore, measurement accuracy is high even in the case where the resonant frequency changes steeply for small changes in the distance between the cantilever and the sample as shown in FIG. 1(b) on the left side of the minimum point of the curve.

Imaging by using a combination of frequency-tracking separately excited system and phase feedback system will be descried next.

Figure 6:
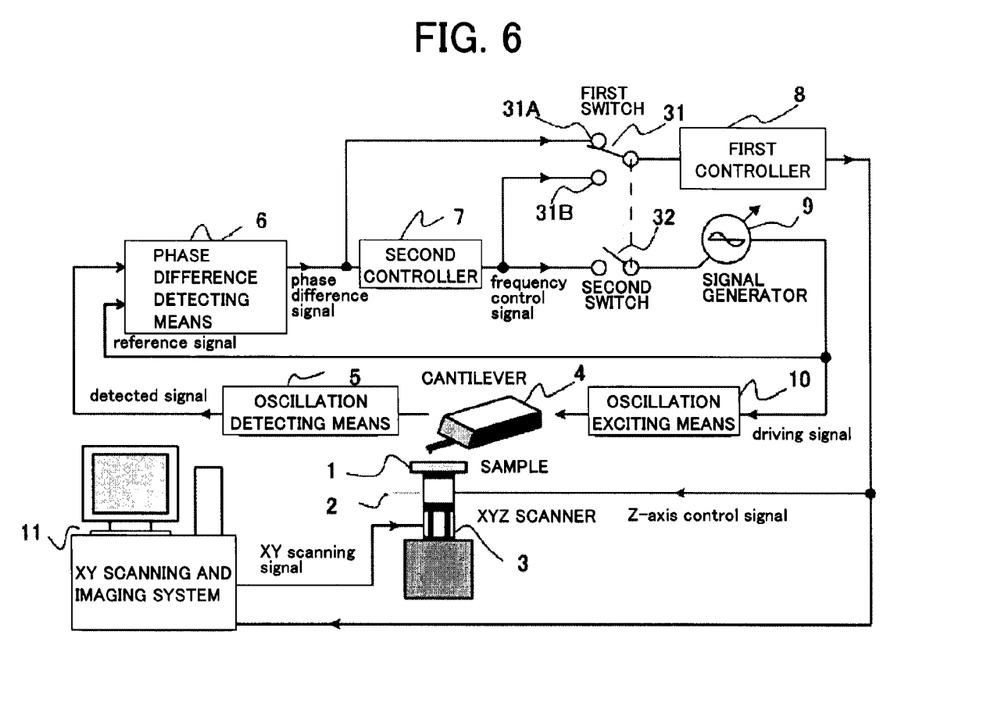
FIG. 6 is a block diagram (No. 1) showing the system configuration (frequency-tracking separately excited system and phase feedback system) of a scanning probe microscope apparatus in accordance with a second embodiment of the present invention.

FIG. 6 is block diagram (No. 1) of the system configuration (frequency-tracking separately excited system and phase feedback system) of a scanning probe microscope apparatus in accordance with a second embodiment of the present invention.

In this system, there are further provided a first terminal 31A, a second terminal 31B, a first switch 31 and a second switch 32. The first terminal 31A receives the phase difference signal from the phase difference detecting means 6, and the second terminal 31B receives the frequency control signal from the second controller 7. The first switch 31 switches between the first terminal 31A and the second terminal 31B. The second switch 32 switches the frequency control signal from the second controller 7 on and off. The first controller 8 is connected to the output side of the first switch 31, and the signal generator 9 is connected to the output side of the second switch 32.

By further providing the first switch 31 that switches between the output signal from the phase difference detecting means 6 and the output signal from the second controller 7, and the second switch 32 that switches the output signal from the second controller 7 on and off, phase feedback system and frequency-tracking separately excited system become switchable in this system.

In the stage of preparation by hand such as setting up the cantilever 4 and the sample 1, the distance between the cantilever 4 and the sample 1 is of millimeter order. On the other hand, the distance between the cantilever 4 and the sample 1 must be of nanometer order in order to image the sample 1 by the scanning probe microscope. However, the movable distance of the scanner of the Z-axis (typically a piezoelectric element) is of micrometer order at most. It is therefore necessary to provide a coarse positioning mechanism with movable distance of millimeter order besides the Z-axis scanner in order to bring the distance between the cantilever 4 and the sample 1 to within the movable distance of the Z-axis scanner.

In phase feed back system, however, the frequency of the signal generator 9 is changed in order to change the distance between the cantilever 4 and sample 1, and as a result the distance is controlled for the frequency of the single generator to match the resonant frequency. Therefore, this control system works only within a movable distance of the Z-axis scanner. In other words, phase feedback system does not work when the distance is previously given, thus it cannot be used when the coarse positioning mechanism for the Z-axis is used.

This problem can be solved by the system shown in FIG. 6. In this system, frequency-tracking separately excited system is used during a process where the distance between the cantilever 4 and the sample 1 is changed to the predetermined distance, then frequency-tracking separately excited system is switched to the phase feedback system.

According to the present invention, the cantilever 4 is separately (forcibly) oscillated by the signal with stabilized amplitude from the signal generator. Therefore, the amplitude of oscillation can be stabilized even when the Q value of the cantilever 4 is low. The phase difference between the driving signal and the detected signal reflects the difference between the frequency of the driving signal and the resonant frequency of the cantilever 4. Changes in the phase difference during scanning of the sample 1 by the cantilever 4 means that the interaction force between the cantilever 4 and the sample 1 is also changed. In this system, two methods can be used in order for the phase difference to become zero during scanning by the cantilever 4. In the first method, the resonant frequency of the cantilever 1 is controlled to match the frequency of the driving signal by changing the distance between the cantilever 4 and the sample 1, i.e. the interaction force between the cantilever 4 and the sample 1 is controlled to be kept constant. Thus, the distance between the cantilever 4 and the sample 1 is obtained as the surface shape image. In the second method, the driving signal is fed back by adjusting the frequency of the driving signal to match the resonant frequency of the cantilever 4. Then, the interaction force between the cantilever 4 and the sample 1 is estimated and imaged. Or, another feedback loop is configured, the distance between the cantilever 4 and the sample 1 is changed such that the interaction force is constant, then the change in the distance is obtained as the surface shape image. In both methods, the response time of the control loop can be determined by a required S/N ratio. Even if the response time is slowed to obtain high S/N ratio, there is no factor to reduce the detection sensitivity of the resonant frequency in contrast to the conventional technology.

In this embodiment, as described above, there are provided the first switch 31 that switches between the first terminal 31A for receiving the phase difference signal from the phase difference detecting means 6 and the second terminal 31B for receiving the frequency control signal from the second controller 7, and the second switch 32 that switches the frequency control signal from the second controller 7 on and off. The first controller 8 is connected to the output side of the first switch 31, and the signal generator 9 is connected to the output side of the second switch 32. However, the same result as this embodiment can be realized without using the switches. The following are examples of such a method: a method in which the first controller and the second controller are realized by digital signal processing, and connection of the digital signal line therebetween is switched by digital switches; a method in which a program of a programmable logic device (PLD) which digitally implements the first controller and the second controller is changed, and the same result as switching in this embodiment is obtained; a method in which the first controller and the second controller are realized in software by using a microcomputer or a digital signal processor (DSP), the algorithm of the software is changed, and switching is realized.

Figure 7:
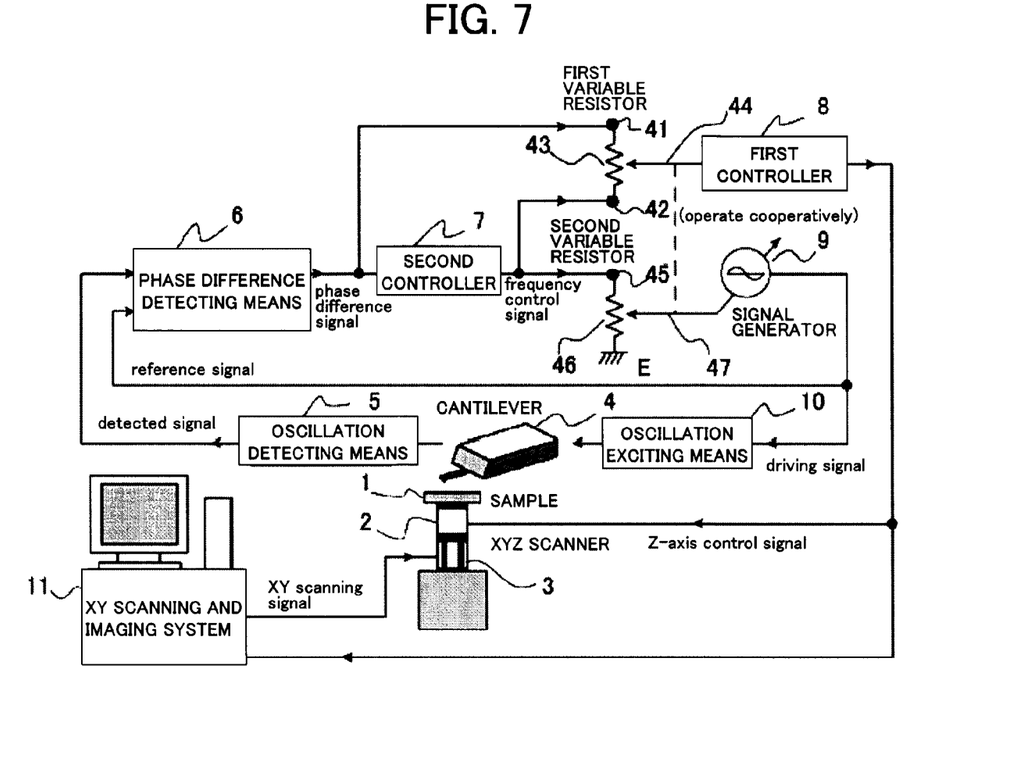
FIG. 7 is a block diagram (No. 2) showing the system configuration (frequency-tracking separately excited system and phase feedback system) of a scanning probe microscope apparatus in accordance with a second embodiment of the present invention.

FIG. 7 is a block diagram (No. 2) showing the system configuration (frequency-tracking separately excited system and phase feedback system) of a scanning probe microscope apparatus in accordance with a second embodiment of the present invention.

In this embodiment, a first variable resistor 43 is disposed between a first terminal 41 and a second terminal 42. The fist terminal 41 receives the phase difference signal, and the second terminal 42 receives the frequency control signal. The first controller 8 can be connected to an adjusted point on the first variable resistor 43 via a first wiper 44. Also, a second variable resistor 46 is disposed between a third terminal 45 and a ground E. The third terminal 45 receives the frequency control signal. The signal generator 9 can be connected to an adjusted point on the second variable resistor 46 via by a second wiper 47. The first wiper 44 and the second wiper 47 are configured to operate cooperatively.

As described above, a device that mixes the phase difference signal from the phase difference detecting means 6 and the frequency control signal from the second controller 7 at an arbitrary ratio and transmits the mixed signal to the first controller 8, and a device that adjusts the frequency control signal to an arbitrary intensity and transmits the adjusted signal to the signal generator 9 can be provided. In this case, electrical circuitry can be used instead of the variable resistors.

In this embodiment, approaching of the cantilever 4 to the sample 1 is carried out after frequency-tracking separately excited system is established by moving the first wiper 44 to the side of the second terminal 42 and the second wiper 47 to the uppermost position. Imaging is performed after phase feedback system is established by moving the first wiper 44 to the side of the first terminal 41 and moving the second wiper 47 to the ground position E. Use of the variable resistors can prevent the sample 1 and cantilever 4 from being damaged by sudden movements of the Z-axis due to discontinuous changes in the signals during a switching process from frequency-tracking separately excited system to phase feedback system. Imaging can also be performed in frequency-tracking separately excited system.

Figure 8:
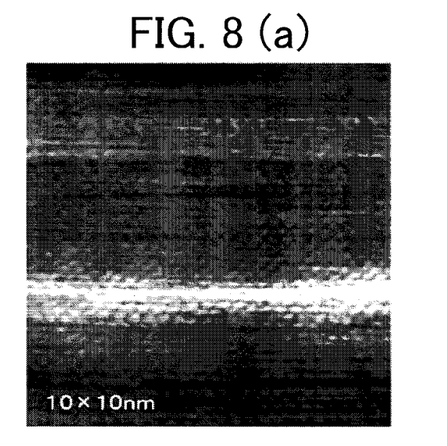
FIG. 8(a), FIG. 8(b) and FIG. 8(c) show AFM images of a cleaved mica imaged by the scanning probe microscope apparatus of the present invention.

FIG. 8(a), FIG. 8(b) and FIG. 8(c) show AFM images of a cleaved mica imaged by the scanning probe microscope apparatus of the present invention. FIG. 8(a), FIG. 8(b) and FIG. 8(c) are shown in the size of 10×10 nm, 5×5 nm, and 2×2 nm, respectively.

A commercially available cantilever made from silicon was used here. Imaging was performed by using the second deflection mode in pure water. The resonant frequency of the cantilever in the second flexural mode in pure water measured prior to imaging was 862 kHz. Imaging was performed under a repulsive force region at which the resonant frequency was 882 kHz. The amplitude was kept at 0.38 nm pp.

Figure 9:
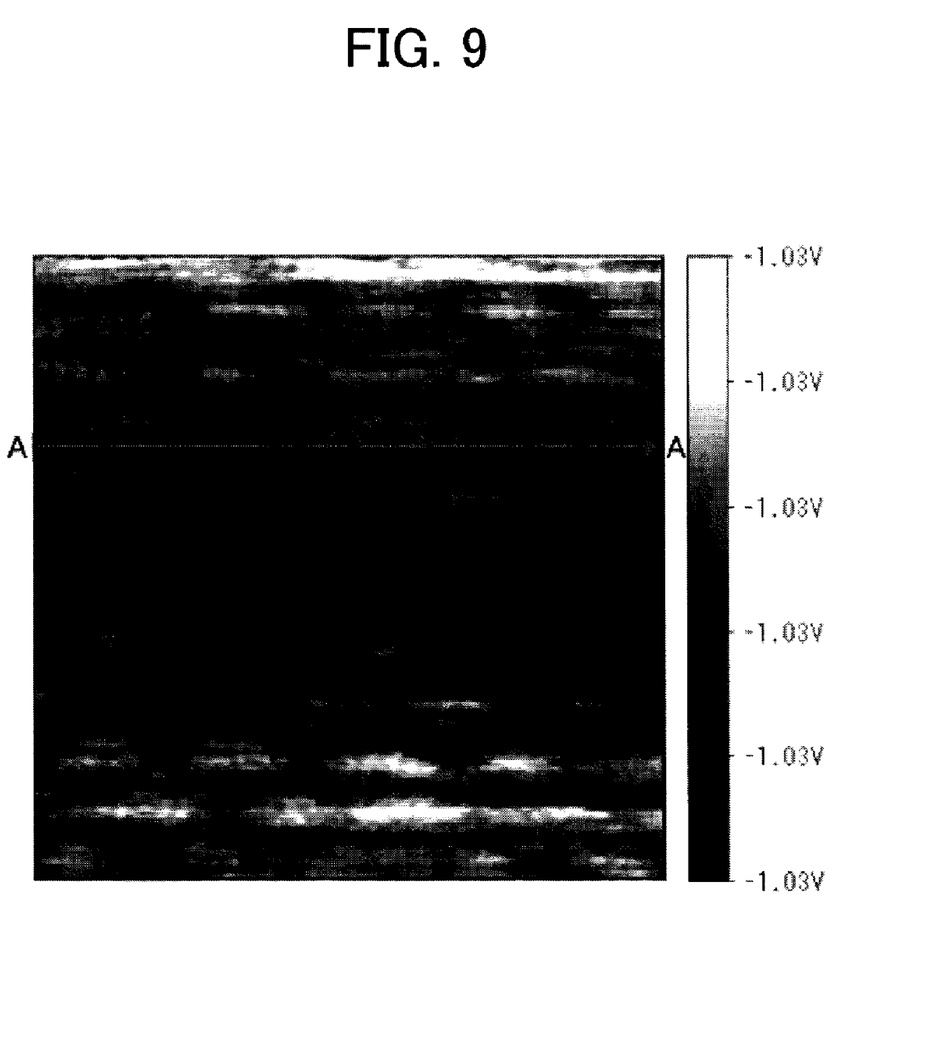
FIG. 9 shows an AFM image of a cleaved mica sample imaged by the scanning probe microscope apparatus of the present invention (See FIG. 8(c)).
Figure 10:
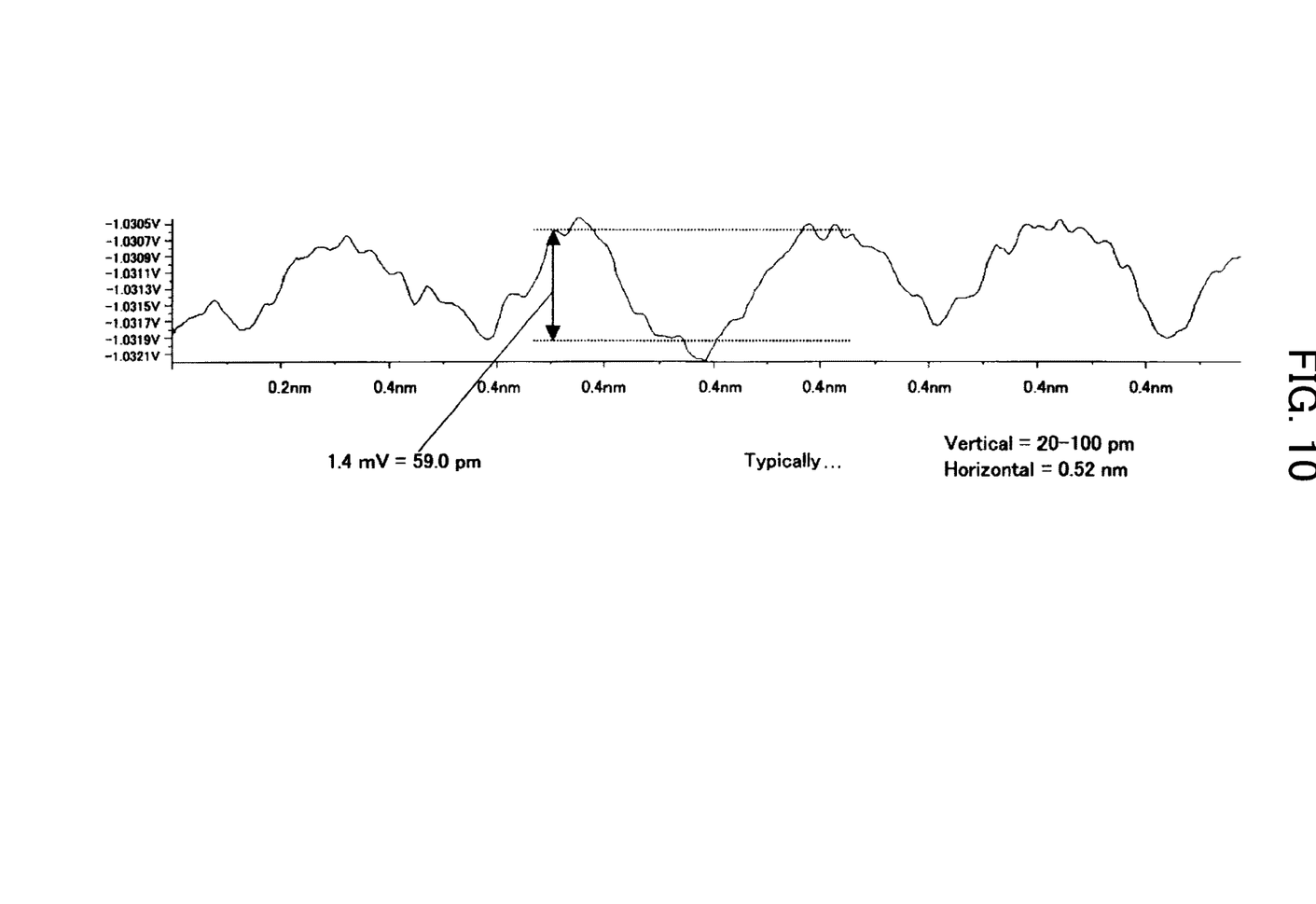
FIG. 10 is a cross sectional view taken along the line A-A of FIG. 9.

FIG. 9 shows an AFM image of a cleaved mica sample (see FIG. 8(c)) imaged by the scanning probe microscope apparatus of the present invention. FIG. 10 shows a cross sectional view taken along the line A-A of FIG. 9.

As shown in this image, in accordance with the present invention, images of surface shape of a tiny sample in pm level can be obtained.

The cantilever is described as a probe in the above embodiments, however, various probes can be used in the case where a mechanical oscillator is used.

The present invention is not limited to the embodiments described above and various modifications can be made without departing from the scope of the present invention. Accordingly, those modifications shall not be excluded from the scope of the invention.

According to the present invention, the cantilever is separately oscillated by the signal with stabilized amplitude from the signal generator. Therefore, the amplitude of oscillation can be stabilized even when the Q value of the cantilever is low.

INDUSTRIAL APPLICABILITY

A scanning probe microscope apparatus in accordance with the present invention can be utilized for scanning probe microscope imaging samples with high accuracy.

The invention claimed is:

1. A scanning probe microscope apparatus for imaging a sample using an interaction between the sample and a mechanical oscillator, the scanning probe microscope apparatus comprising:
a first controller;
an XYZ scanner for the sample and an XY scanning and imaging system, each being connected to the first controller;
a signal generator;
an oscillation exciting means connected to the signal generator;
a mechanical oscillator forcibly oscillated by an output signal from the oscillation exciting means;
an oscillation detecting means for detecting an oscillation of the mechanical oscillator,
a phase difference detecting means connected to the oscillation detecting means;
a second controller for receiving a phase difference signal from the phase difference detecting means and transmitting a frequency control signal to the first controller and the signal generator;
a device for mixing the phase difference signal and the frequency control signal at an arbitrary ratio and transmitting the mixed signal to the first controller; and
a device for adjusting the frequency control signal to an arbitrary intensity and transmitting the adjusted signal to the signal generator;
wherein the signal generator is configured to generate a driving signal having a frequency close to the resonant frequency of the mechanical oscillator and to transmit the driving signal to the oscillation exciting means to oscillate the mechanical oscillator forcibly, and phase difference detected by the phase difference detecting means is kept constant.

2. A scanning probe microscope apparatus for imaging a sample using an interaction between the sample and a mechanical oscillator, the scanning probe microscope apparatus comprising:
a first controller (8);
an XYZ scanner (3) for the sample (1) and an XY scanning and imaging system (11), each being connected to the first controller (8);
a signal generator (9);
an oscillation exciting means (10) connected to the signal generator (9);
a mechanical oscillator (4) forcibly oscillated by an output signal from the oscillation exciting means(10);
an oscillation detecting means (5) for detecting an oscillation of the mechanical oscillator (4),
a phase difference detecting means (6) connected to the oscillation detecting means (5);
a second controller (7) for receiving a phase difference signal from the phase difference detecting means (6) and transmitting a frequency control signal to the first controller (8) and the signal generator (9);
first connecting means (31A) for receiving the phase difference signal from the phase difference detecting means (6);
second connecting means (31B) for receiving the frequency control signal from the second controller (7);
first switching means (31) for switching between the first connecting means (31A) and the second connecting means (31B);
second switching means (32) for switching the frequency control signal from the second controller (7) on and off; and
a coarse positioning mechanism for changing the distance between the mechanical oscillator (4) and the sample (1);
wherein the first controller (8) is connected to the output side of the first switching means (31) and the signal generator (9) is connected to the output side of the second switching means (32), such that the first switching means (31) switches between the output signal from the phase difference detecting means (6) and the output signal from the second controller (7), the second switch (32) switches the output signal from the second controller (7) on and off, frequency-tracking separately excited system is used during a process where the distance between the mechanical oscillator (4) and the sample (1) is changed by the coarse positioning mechanism to the predetermined distance and then switched to phase feedback system.

3. The scanning probe microscope apparatus according to claim 1 or 2, wherein a resonant frequency of the mechanical oscillator is measured and an interaction force between the sample and the mechanical oscillator is imaged based on the resonant frequency.

4. The scanning probe microscope apparatus according to claim 1 or 2, wherein a resonant frequency of the mechanical oscillator is measured and a surface shape of the sample is imaged based on the resonant frequency.

5. The scanning probe microscope apparatus according to claim 1 or 2, wherein a resonant frequency of the mechanical oscillator is measured and a relationship between the resonant frequency and a distance between the mechanical oscillator and the sample is obtained based on the resonant frequency.

6. The scanning probe microscope apparatus according to claim 1 or 2, wherein the mechanical oscillator is a cantilever.

\* \* \* \* \*